United States Patent
Hwang et al.

(10) Patent No.: US 10,351,668 B2
(45) Date of Patent: Jul. 16, 2019

(54) PROCESS FOR REDUCING DIETHYLENE GLYCOL FORMATION IN POLYETHYLENE TEREPHTHALATE

(71) Applicant: Far Eastern New Century Corporation, Taipei (TW)

(72) Inventors: Der-Ren Hwang, Taipei (TW); Cheng-Ting Wang, Taipei (TW); Hsiao-Chan Wang, Taipei (TW)

(73) Assignee: Far Eastern New Century Corporation, Taipei (TW)

( * ) Notice: Subject to any disclaimer, the term of this patent is extended or adjusted under 35 U.S.C. 154(b) by 22 days.

(21) Appl. No.: 15/795,679

(22) Filed: Oct. 27, 2017

(65) Prior Publication Data

US 2019/0002632 A1 Jan. 3, 2019

(30) Foreign Application Priority Data

Jun. 30, 2017 (TW) .............................. 106121900 A

(51) Int. Cl.
*C08G 63/86* (2006.01)
*C08G 63/183* (2006.01)

(52) U.S. Cl.
CPC ......... *C08G 63/866* (2013.01); *C08G 63/183* (2013.01)

(58) Field of Classification Search
USPC .......................... 528/271, 272, 273, 274, 285
See application file for complete search history.

(56) References Cited

U.S. PATENT DOCUMENTS

2008/0027206 A1* 1/2008 Jenkins .................. C08G 63/83
528/275

FOREIGN PATENT DOCUMENTS

| JP | S5082197 | 7/1975 |
| JP | 200026584 A | 1/2000 |
| JP | 2010241974 A | 10/2018 |

OTHER PUBLICATIONS

Office Action dated Dec. 18, 2018, issued to Japanese counterpart application No. 2017-211434.

* cited by examiner

*Primary Examiner* — Terressa Boykin
(74) *Attorney, Agent, or Firm* — Cesari and McKenna, LLP

(57) ABSTRACT

A process for reducing diethylene glycol formation in polyethylene terephthalate includes (a) subjecting a mixture of bis(2-hydroxyethyl)terephthalate with aromatic polycarboxylic acid to an esterification reaction, and (b) subjecting the esterification reaction product to polycondensation.

6 Claims, No Drawings

PROCESS FOR REDUCING DIETHYLENE GLYCOL FORMATION IN POLYETHYLENE TEREPHTHALATE

CROSS-REFERENCE TO RELATED APPLICATION

This application claims priority from Taiwanese patent application no. 106121900, filed on Jun. 30, 2017.

FIELD

The disclosure relates to a process for reducing diethylene glycol formation in polyester, more particularly to a process for reducing diethylene glycol formation in polyethylene terephthalate.

BACKGROUND

Polyester materials are excellent in mechanical properties, abrasion resistance, wrinkle resistance, elasticity, dimensional stability, electric insulation, chemical resistance, etc., and are widely used in the textile industry, the packaging of articles, the field of engineering plastics, and so on. However, in the process of making polyesters, diethylene glycol (DEG) by-product is unavoidably formed from ethylene glycol. The greater the concentration of DEG in the polyester, the worse the properties (such as mechanical properties, heat stability, and so on) of polyester is.

To solve such problem, many approaches are proposed, such as U.S. Pat. No. 3,749,697. It is disclosed in this U.S. patent that formation of contaminate diethylene glycol by-product during manufacture of poly(ethyleneterephthalate) prepolymer in presence of catalyst mixture is minimized by including lithium acetate dehydrate as an essential ingredient in the catalyst mixture.

In addition, U.S. Pat. No. 6,350,851 discloses a method of producing a polyester from high-purity bis-β-hydroxyethyl terephthalate as a raw material containing cations and anions in trace amounts. In the method, ethylene glycol is added as a main solvent.

SUMMARY

An object of the disclosure is to provide a novel process for reducing diethylene glycol formation in polyethylene terephthalate. In this novel process, bis(2-hydroxyethyl) terephthalate is esterified with aromatic polycarboxylic acid to obtain an esterification reaction product for making polyethylene terephthalate with an reduced amount of diethylene glycol and improved heat stability.

According to the disclosure, a process for reducing diethylene glycol formation in polyethylene terephthalate includes the steps of: (a) subjecting a mixture of bis(2-hydroxyethyl)terephthalate with aromatic polycarboxylic acid to an esterification reaction; and (b) subjecting the esterification reaction product to polycondensation.

DETAILED DESCRIPTION

A process for reducing diethylene glycol (DEG) formation in polyethylene terephthalate according to an embodiment of this disclosure includes the steps of: (a) subjecting a mixture of bis(2-hydroxyethyl)terephthalate with aromatic polycarboxylic acid to an esterification reaction; and (b) subjecting the esterification reaction product to polycondensation.

In this disclosure, bis(2-hydroxyethyl) terephthalate is a monomer represented by chemical formula (A)

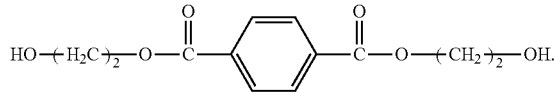

(A)

Bis(2-hydroxyethyl) terephthalate may be obtained from commercial available chemical-grade chemicals, or may be made by alcoholysis of polyethylene terephthalate in ethylene glycol or by reacting terephthalic acid with ethylene oxide.

In this disclosure, bis(2-hydroxyethyl) terephthalate oligomer is made by subjecting a mixture of ethylene glycol and terephthalic acid to an esterification reaction.

Because the aromatic polycarboxylic acid can react with bis(2-hydroxyethyl) terephthalate under a normal pressure, the esterification reaction therebetween can be carried out by a relatively low energy. In addition, in the process of this disclosure, a weight ratio of the final product (i.e., PET) based on total weight of the starting materials (i.e., bis(2-hydroxyethyl)terephthalate and aromatic polycarboxylic acid) is relatively high, and thus the amount of ethylene glycol that needs to be removed is relatively small, compared to a conventional process in which ethylene glycol is used as one of staring materials for making a polyester precursor.

Preferably, the aromatic polycarboxylic acid is selected from the group consisting of aromatic dicarboxylic acid, aromatic tricarboxylic acid, aromatic tetracarboxylic acid, and combinations thereof.

Preferably, the aromatic dicarboxylic acid is selected from the group consisting of terephthalic acid, isophthalic acid, phthalic acid, biphenyl-4,4'-dicarboxylic acid, 2,6-naphthalenedicarboxylic acid, 1,5-naphthalenedicarboxylic acid, and combinations thereof.

The aromatic tricarboxylic acid may be, not limited to, trimesic acid.

The aromatic tetracarboxylic acid may be, not limited to, 1,2,4,5-benzenetetracarboxylic acid.

Preferably, the aromatic polycarboxylic acid is the aromatic dicarboxylic acid. More peferably, the aromatic dicarboxylic acid is terephthalic acid, isophthalic acid, or a combination thereof.

A ratio of bis(2-hydroxyethyl)terephthalate to aromatic polycarboxylic acid may be adjusted based on desired viscosity (molecular weight) of the polyester. A molar ratio of bis(2-hydroxyethyl)terephthalate to aromatic polycarboxylic acid ranges preferably from 20:1 to 1:1, more preferably from 6.5:1 to 1:1.

In examples of this disclosure, the aromatic dicarboxylic acid is terephthalic acid. Preferably, a molar ratio of bis(2-hydroxyethyl)terephthalate to terephthalic acid ranges from 6.5:1 to 1:1.

The temperature of step (a) may be any temperature to permit the esterification reaction. Preferably, the temperature in step (a) ranges from 220° C. to 260° C.

The pressure of step (a) may be any pressure to permit the esterification reaction. It should be noted that because the alcohol in the esterification reaction is bis(2-hydroxyethyl) terephthalate, this reaction can be performed in normal pressure.

The conditions of step (b) may be adjusted to permit the polycondensation reaction. Preferably, the polycondensation reaction is performed in presence of a catalyst. The catalyst may be, not limited to, an antimony-containing compound, a germanium-containing compound, a stannum-containing compound, a titanium-containing compound, an aluminum-containing compound, or combinations thereof. Preferably, the catalyst is selected from the group consisting of antimony trioxide ($Sb_2O_3$), antimony(III) acetate, ethylene glycol antimony, titanium isopropoxide, titanium butoxide, germanium oxide, dibutyltin oxide, n-butyl hydroxytin oxide, and combinations thereof. The amount of the catalyst may be adjusted based on requirements, for example, the degree of the polycondensation reaction. The timing of adding the catalyst may be, for example, after conversion of the esterification reaction is above 80%.

The temperature and pressure of step (b) may be any ones to permit the polycondensation reaction. Preferably, the temperature in step (b) ranges from 270° C. to 285° C.

The embodiments of the disclosure will now be explained in more detail below by way of the following examples and comparative examples.

In the following examples, bis(2-hydroxyethyl) terephthalate powders were made by alcoholysis of polyethylene terephthalate in ethylene glycol according to a paper entitled "Study on depolymerization of waste polyethylene terephthalate into monomer of bis(2-hydroxyethyl terephthalate)" and published in Polymer Degradation and Stability, Volume 87, Issue 1, January 2005, Pages 117-120. The spectrum analysis for the obtained bis(2-hydroxyethyl) terephthalate is: $^1$H NMR (DMSO-$d_6$, 400 MHz), δH:3.70-3.74 (m, 4H, $CH_2$); 4.32 (t, 4H, J=4.8 Hz, $CH_2$); 4.95 (t, 2H, J=5.6 Hz, OH); 8.12 (s, 4H, Ar).

Example 1 (EX1)

Bis(2-hydroxyethyl)terephthalate powders (2532.3 g, 9.97 mole) and terephthalic acid (506.5 g, 3.05 mole) were poured and mixed in a 5-liter reactor. Nitrogen gas was introduced into the reactor to replace air thereinside so that the pressure in the reactor was set to be 0.5 kg/cm$^2$~1 kg/cm$^2$. Thereafter, the mixture in the reactor was subjected to an esterification reaction at 260° C. under nitrogen atmosphere at a normal pressure until conversion of the esterification reaction was about 89.4% to obtain an esterification reaction product. Then, antimony trioxide (0.748 g) and an ethylene glycol solution (3.750 g, 5 wt % phosphoric acid contained therein) were poured and mixed in the reactor, and the mixture in the reactor was subjected to polycondensation at 275° C. until specific viscosity of the mixture was above 0.57, thereby obtaining a polyester (polyethylene terephthalate) in which the amount of antimony was 250 ppm and the amount of phosphoric acid was 75 ppm. The adding amounts of the antimony trioxide and the ethylene glycol solution were calculated based on the amounts of antimony and phosphoric acid included in the obtained polyester.

Example 2 (EX2)

A polyester of Example 2 was prepared according to a procedure similar to that described in Example 1, except that in Example 2, bis(2-hydroxyethyl)terephthalate powders (2051.6 g, 8.08 mole) and terephthalic acid (820.6 g, 4.94 mole) were poured in the reactor, and conversion of the esterification reaction was about 83.1%.

Example 3 (EX3)

A polyester of Example 3 was prepared according to a procedure similar to that described in Example 1, except that in Example 3, bis(2-hydroxyethyl) terephthalate powders (1873.8 g, 7.38 mole) and terephthalic acid (936.9 g, 5.64 mole) were poured in the reactor, and conversion of the esterification reaction was about 80.3%.

Example 4 (EX4)

A polyester of Example 4 was prepared according to a procedure similar to that described in Example 1, except that in Example 3, bis(2-hydroxyethyl) terephthalate powders (1724.3 g, 6.79 mole) and terephthalic acid (1034.5 g, 6.23 mole) were poured in the reactor, and conversion of the esterification reaction was about 75.2%.

Comparative Example 1 (CE1)

Ethylene glycol (1009.1 g, 16.28 mole) and terephthalic acid (2161.5 g, 13.02 mole) were poured and mixed in a 5-liter reactor. Nitrogen gas was introduced into the reactor to replace air thereinside so that the pressure in the reactor was set to be 0.5 kg/cm$^2$~1 kg/cm$^2$. Thereafter, the mixture in the reactor was subjected to an esterification reaction at 260° C. under nitrogen atmosphere at 2 kg/cm$^2$ until conversion of the esterification reaction was about 90.8% to obtain a precursor (i.e., bis(2-hydroxyethyl) terephthalate oligomer). Then, antimony trioxide (0.748 g) and an ethylene glycol solution (3.750 g, 5 wt % phosphoric acid contained therein) were poured and mixed in the reactor, and the mixture in the reactor was subjected to polycondensation at 275° C. until viscosity of the mixture was above 0.57, thereby obtaining a polyester (polyethylene terephthalate) in which the amount of antimony was 250 ppm and the amount of phosphoric acid was 75 ppm. The adding amounts of the antimony trioxide and the ethylene glycol solution were calculated based on the amounts of antimony and phosphoric acid included in the obtained polyester.

Comparative Example 2 (CE2)

A polyester of Comparative Example 2 was prepared according to a procedure similar to that described in Comparative Example 1, except that in Comparative Example 2, conversion of the esterification reaction was about 93.6%.

Comparative Example 3 (CE3)

A polyester of Comparative Example 2 was prepared according to a procedure similar to that described in Comparative Example 1, except that in Comparative Example 2, conversion of the esterification reaction was about 86.5%.

Comparative Example 4 (CE4)

Ethylene glycol (504.5 g, 8.14 mole), terephthalic acid (1080.7 g, 6.51 mole), and bis(2-hydroxyethyl)terephthalate oligomer (1250 g) were poured and mixed in a 5-liter reactor. Nitrogen gas was introduced into the reactor to replace air thereinside so that the pressure in the reactor was set to be 0.5 kg/cm$^2$~1 kg/cm$^2$. Thereafter, the mixture in the reactor was subjected to an esterification reaction at 260° C. under nitrogen atmosphere at a normal pressure until conversion of the esterification reaction was about 89.4% to obtain an esterification reaction product. Then, antimony trioxide (0.748 g) and an ethylene glycol solution (3.750 g, 5 wt % phosphoric acid contained therein) were poured in the reactor to be mixed with the esterification reaction product, and the mixture in the reactor was subjected to polycondensation at 275° C. until viscosity of the mixture was above 0.57, thereby obtaining a polyester (polyethylene terephthalate) in which the amount of antimony was 250 ppm and the amount of phosphoric acid was 75 ppm. The adding amounts of the antimony trioxide and the ethylene glycol solution were calculated based on the amounts of antimony and phosphoric acid included in the obtained polyester.

The polyesters of EX1 to EX4 and CE1 to CE4 were respectively subjected to granulation, and were evaluated as follows.

Instruments Inc., TGA 2950). The TGA was performed under oxygen atmosphere and was set to scan from 30° C. to 600° C. at a heating rate of 10° C./min. The decomposition temperatures (5% weight loss) for EX1 to EX4 and CE1 to CE4 were measured and listed in Table 1.

Concentration of Diethylene Glycol

The polyester granules of each of EX1 to EX4 and CE1 to CE4 were mixed with 1,4-butanediol, a 1-propanol solution in which potassium hydroxide was dissolved was added to dissolve the polyester granules so as to obtain a polyester solution, and a suitable amount of a hydrogen chloride solution (1.6N) was mixed with the polyester solution to obtain a mixture. A clear portion of the mixture was collected and injected to a gas chromatograph (manufactured by Thermo Scientific, Trace 1310) for analyzing concentration of diethylene glycol (DEG). The results are listed in Table 1.

TABLE 1

| | Mole ratio | | I.V. | Color coordinate value | | | DEG Conc. (%) | Td (° C.) |
|---|---|---|---|---|---|---|---|---|
| | EG:TPA | BHET:TPA | | L | $L_a$ | $L_b$ | | |
| EX1 | — | 3.27:1 | 0.586 | 57.9 | −2.0 | 5.1 | 1.01 | 367.45 |
| EX2 | — | 1.63:1 | 0.595 | 59.4 | 1.1 | 4.2 | 0.76 | 357.58 |
| EX3 | — | 1.31:1 | 0.589 | 60.1 | −1.6 | 3.9 | 0.74 | 377.83 |
| EX4 | — | 1.09:1 | 0.596 | 65.0 | 0.6 | 2.0 | 0.64 | 361.72 |
| CE1 | 1.25:1 | — | 0.552 | 62.3 | −1.2 | 6.6 | 3.56 | 346.56 |
| CE2 | 1.25:1 | — | 0.606 | 63.0 | −1.8 | 4.8 | 3.47 | 351.96 |
| CE3 | 1.25:1 | — | 0.573 | 64.3 | −0.5 | 5.8 | 3.24 | 338.11 |
| CE4 | 1.25:1 | — | 0.613 | 53.4 | −2.1 | 10.1 | 2.98 | 345.76 |

Note:
EG = ethylene glycol;
TPA = terephthalic acid;
BHET = monomer of bis (2-hydroxyethyl) terephthalate;
I.V. = intrinsic viscosity;
DEG = diethylene glycol;
Td = decomposition temperature.

Intrinsic Viscosity (I.V.)

The polyester granules of each of EX1 to EX4 and CE1 to CE4 were added into a mixture of phenol and tetrachloroethane in which a weight ratio of phenol to tetrachloroethane is 3:2 to formulate a sample solution (concentration: 0.4 wt./vol %). An intrinsic viscosity of the sample solution was measured at 30±0.02° C. using an Ubbelohde viscometer. The results for the polyester granules of EX1 to EX4 and CE1 to CE4 are shown in Table 1.

Color Coordinate Values (L, $L_a$, and $L_b$)

Color coordinate values (L, $L_a$, and $L_b$) of the polyester granules of each of EX1 to EX4 and CE1 to CE4 were measured using a colorimeter (manufactured by NIPPON DENSHOKU INDUSTRIES CO., LTD., NE4000). The L value describes the brightness of the color. The larger the L value, the higher the whiteness of the color. The $L_a$ value describes the red/green composition of the color. The more positive the $L_a$ value, the more red the color. The more negative the $L_a$ value, the more green the color. The value of $L_b$ value describes the yellow/blue composition of the color. The more positive the $L_b$ value, the more yellow the color. The more negative the $L_b$ value, the more blue the color. In the case of the polyester granules, it is preferable that both the $L_a$ value and the $L_b$ value are close to zero. The results for the polyester granules of EX1 to EX4 and CE1 to CE4 are shown in Table 1.

Decomposition Temperature (Td)

The polyester granules of each of EX1 to EX4 and CE1 to CE4 were subjected to thermoanalysis using a thermogravimetric analysis instrument (TGA, manufactured by TA It can be noted from Table 1, compared to the polyester granules of CE1 to CE4, the polyester granules of EX1 to EX4 had relatively low concentrations of diethylene glycol, and relatively high decomposition temperatures.

Therefore, the polyester (i.e., polyethylene terephthalate), which is made by subjecting a mixture of bis(2-hydroxyethyl)terephthalate with aromatic polycarboxylic acid to an esterification reaction followed by subjecting the esterification reaction product to polycondensation, may have good heat stability and mechanical properties due to lower concentration of diethylene glycol.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A process for reducing diethylene glycol formation in polyethylene terephthalate, comprising the steps of:
    (a) subjecting a mixture of bis(2-hydroxyethyl)terephthalate, which is a monomer, and terephthalic acid to an esterification reaction in the absence of a catalyst and ethylene glycol; and
    (b) subjecting the esterification reaction product to polycondensation to form polyethylene terephthalate.

2. The process according to claim 1, wherein, in step (a), a molar ratio of bis(2-hydroxyethyl)terephthalate to terephthalic acid ranges from 20:1 to 1:1.

3. The process according to claim 2, wherein, in step (a), a molar ratio of bis(2-hydroxyethyl)terephthalate to terephthalic acid ranges from 6.5:1 to 1:1.

4. The process according to claim 1, wherein the esterification reaction is performed in normal pressure.

5. The process according to claim 1, wherein step (b) is performed in the presence of a catalyst.

6. The process according to claim 5, wherein the catalyst is selected from the group consisting of antimony trioxide, antimony(III) acetate, ethylene glycol antimony, titanium isopropoxide, titanium butoxide, germanium oxide, dibutyltin oxide, n-butyl hydroxytin oxide, and combinations thereof.

* * * * *